United States Patent [19]

Heidemann et al.

[11] Patent Number: 5,378,937
[45] Date of Patent: * Jan. 3, 1995

[54] EQUALIZER FOR OPTICAL COMMUNICATION SYSTEMS

[75] Inventors: Rolf Heidemann, Tamm; Heinz Krimmel, Stuttgart; Bernhard Junginger, Herrenberg, all of Germany

[73] Assignee: Alcatel N.V., Netherlands

[*] Notice: The portion of the term of this patent subsequent to Apr. 12, 2011 has been disclaimed.

[21] Appl. No.: 905,724

[22] Filed: Jun. 29, 1992

[30] Foreign Application Priority Data

Jun. 29, 1991 [DE] Germany .............................. 4121570

[51] Int. Cl.[6] .................. H03K 3/26; G06G 7/12; H03G 11/04; H03H 5/00
[52] U.S. Cl. ..................................... 327/306; 333/18; 333/28 R; 359/180; 327/325; 327/586
[58] Field of Search ............. 331/36 R; 333/18, 28 R, 333/164; 359/180; 307/320, 490, 491, 503

[56] References Cited

U.S. PATENT DOCUMENTS

5,302,922  4/1994  Heidemann et al. .................. 333/18

FOREIGN PATENT DOCUMENTS

3307309  9/1984  Germany .
1165214  6/1989  Japan .
3094523  4/1991  Japan .
9107027  5/1991  WIPO .

OTHER PUBLICATIONS

"Electrical Predistortion to Compensate for Combined Effect of Laser Chirp and Fibre Dispersion", H. Gysel et al, *Electronics Letters*, Feb. 28, 1991, vol. 27, No. 5, pp. 421–423.
"Equalizer for Step–Index Fiber Transmission System", K. Yamaguchi et al, *Third European Conference on Optical Communication*, Sep. 1977, Munich, pp. 202–204.
"Passive Equalization of Semiconductor Diode Laser Frequency Modulation", S. Alexander et al, *Journal of Lightwave Technology* Jan. 1989, New York, vol. 7, No. 1, pp. 11–23.

*Primary Examiner*—Timothy P. Callahan
*Assistant Examiner*—Trong Phan
*Attorney, Agent, or Firm*—Ware, Fressola, Van Der Sluys & Adolphson

[57] ABSTRACT

To compensate for nonlinear signal distortions in analog optical communication transmission systems, caused by laser chirps and the chromatic dispersion of the optical fiber, an equalizer in the form of an LC component is known, whose capacitance is formed by a variable capacitance diode. However, the known equalizer functions only when the capacitance has the proper polarity, which cannot be predicted because of possible polarity inversion during signal transmission. According to the invention, the variable capacitance diode ($C_a$) has another variable capacitance diode ($C_b$), with the opposite polarity, connected in parallel, and is equally biased in the high-resistance direction. By adjusting the bias voltage of both capacitances, it can be achieved that one of the two variable capacitance diodes takes over the equalization function, and the other is practically inoperative. Further developments of this solution concern keeping the frequency response constant during adjustment of the equalization, by means of a capacitance connected in parallel to the variable capacitance diodes ($C_a$, $C_b$), and the equalization of large bandwidth signals by an LC chain circuit with LC components according to the invention.

8 Claims, 3 Drawing Sheets

EQUALIZER FOR OPTICAL COMMUNICATION SYSTEMS

CROSS-REFERENCE TO RELATED APPLICATION

This application discloses subject matter disclosed and claimed in co-owned, copending application U.S. Ser. No. 07/905836 which is U.S. Pat. No. 5302922, patented Apr. 12,1994, (Atty Docket NO. 907-102/R. Heidemann-23) filed on the same day as this application and hereby expressly incorporated by reference.

TECHNICAL FIELD

The invention concerns a circuit designed to compensate for nonlinear distortions in signals transmitted through optical communications systems.

BACKGROUND OF THE INVENTION

Such a circuit is known from Electronics Letters, Feb. 28, 1991, Volume 27, No. 5, pages 421 to 423. It serves as a transit time component, whose transit time is determined by the input voltage, therefore by the signal voltage, since the variable capacitance diode, which operates in the high-distance direction, changes its capacitance according to the blocking voltage existing therein.

It was shown that the property of the known circuit to equalize signals, is only available in one of the two possible polarities of the variable capacitance diode. Whether or not the circuit, hereinafter simply called "equalizer", produces the desired equalization, depends therefore on whether the variable capacitance diode is connected to the input line by its cathode or its anode.

Which polarity is the right one cannot be predicted, because in practical communication systems, it is possible for the polarity of the signal to be inverted in the transmission path between the laser on the sending side and the location of the equalizer, e.g. by inverting amplifiers, which are unknown to the operator and installer of the communication system, because they play no role, aside from the nonlinear signal distortion of interest in this instance. When such an equalizer is installed in a transmission path, it is undesirable, for practical reasons, to have to determine, by means of a test, the appropriate one of the two possible polarities of the variable capacitance diode. It would rather be desirable to have an equalizing circuit that functions in all instances.

DISCLOSURE OF THE INVENTION

It is therefore the task of this invention to introduce a circuit that equalizes in the known manner, which can simply be adjusted or regulated without repolarizing the variable capacitance diode, so that it performs the desired equalization function in all instances.

According to the present invention, nonlinear distortions in signals transmitted through optical communication systems are compensated by means of an LC section, whose capacitive element includes a reverse-biased varactor diode, wherein an additional reverse-biased varactor diode is connected in inverse parallel with the first-mentioned varactor diode and that bias voltages for biasing said varactor diodes are adjustable so that essentially only one of the varactor diodes has a capacitance varying with the applied signal voltage.

In further accord with the present invention, two additional varactor diodes in series opposition, whose total capacitance is determined by an adjustable bias, may be connected in parallel with the above-mentioned capacitive element of the LC section.

Further according to the present invention, a control circuit may be provide comprising a device for measuring at the output of the LC section a second-order distortion product of one or more pilot signals as a measure of the nonlinear distortions in the transmitted signals, and a controller which adjusts the bias of the essentially only one of the varactor diodes to obtain a maximum reduction of the measured distortion products and maintains the bias of the other varactor diode at a constant maximum value.

Further according to the present invention, a control circuit for controlling the compensating circuit mentioned above comprises a device for measuring second-order distortion products at the output of the LC section first mentioned above, of one or more pilot signals as a measure of the nonlinear distortions in the transmitted signals and a frequency response measuring device responsive to the output of the LC section for measuring the level difference of two pilot signals as a measure of the frequency dependence of the attenuation of the LC section, and a controller which adjusts the bias of the essentially only one of the varactor diodes to obtain a maximum reduction of the measured distortion products and, if necessary, maintains the measured level difference of the two pilot signals constant during said adjustment by varying the bias of the other varactor diode.

In a case where the two additional varactor diodes are provided in series opposition, as mentioned above, in still further accord with the present invention, a control circuit comprises a second-order distortion products measuring device responsive to the output of the LC section, including the two additional varactor diodes in series opposition, for measuring the second order distortion products of one or more pilot signals as a measure of the nonlinear distortions in the transmitted signals, and a frequency response measuring device which measures at the output of the LC section, including the two additional varactor diodes in series opposition, the level difference of the two pilot signals as a measure of the frequency dependence of the attenuation of the transmitted signals, and a controller which adjusts the bias of the essentially only one of the varactor diodes to obtain a maximum reduction of the measured distortion products, maintains the bias of the other varactor diode at a constant maximum value, and adjusts the bias determining the total capacitance of the additional two varactor diodes in series opposition, such that the level difference of the two pilot signals remains substantially independent of the adjustment of the bias of the essentially only one varactor diode.

In still further accord with the present invention, a circuit for compensating for nonlinear distortions in signals transmitted through optical communication systems comprises an LC section whose capacitive element includes a reverse-biased varactor diode wherein two additional varactor diodes in series opposition whose total capacitance is determined by an adjustable bias, are connected in parallel with the reverse-biased varactor diode.

These and other objects, features and advantages of the present invention will become more apparent in light of the detailed description of a best mode embodi-

BEST MODE FOR CARRYING OUT THE INVENTION

Figure 1:
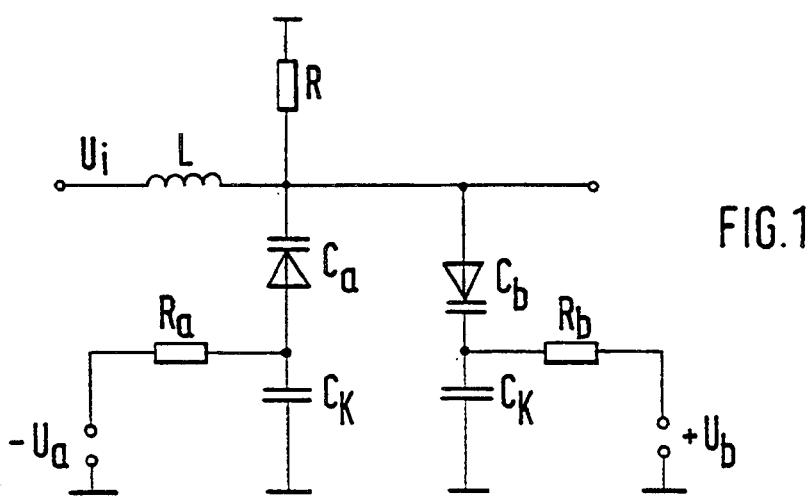
FIG. 1 is a principal wiring diagram of the equalizer according to the invention.

The equalizer according to FIG. 1 has an inductance L and a first variable capacitance diode $C_a$, which is connected by its cathode to inductance L, and has a bias voltage that is polarized in the high-resistance direction, i.e., reverse-biased. So far it corresponds to the equalizer shown in the above mentioned publication (FIG. 4b). The bias voltage for the variable capacitance diode is provided by a DC circuit, which leads from ground through a resistor R, the cathode of variable capacitance diode $C_a$, its anode, through a resistor $R_a$, to the negative pole of a DC voltage source $U_a$, whose other pole is connected to ground.

With this polarity of the variable capacitance diode, the existing blocking voltage increases with positive input voltages $U_i$, thereby decreasing its capacitance, so that more positive voltages pass through the equalizer faster than less positive ones. However, the variable capacitance diode $C_a$, only produces an equalization when the existing transmission path is able to delay more positive voltages longer than less positive voltages. Whether this is so, depends on the number of inverting amplifiers that have been inserted into the path, and can therefore never be predicted with certainty. If the premise is wrong, the equalizer reinforces the existing equalization, instead of opposing it.

To solve the described problem, a second variable capacitance diode $C_b$ is provided, as shown in FIG. 1, and is connected in antiparallel with the first variable capacitance diode $C_a$. While $C_a$, is connected to inductance L by its cathode, $C_b$ is connected to L by its anode. A voltage source $U_b$ is provided, and, together with resistor R and a resistor $R_b$, forms a DC circuit for variable capacitance diode $C_b$, so that it can also be biased in the high-resistance direction. The positive pole of voltage source $U_b$ is connected to the cathode of variable capacitance diode $C_b$, so that it is biased in the high-resistance direction. The nodes of both variable capacitance diodes not connected to inductance L are grounded through capacitors $C_K$ in alternating voltage fashion.

As with the known equalizer, the capacitance of a normal capacitor may also be present, in addition to the capacitance of the variable capacitance diodes.

The new equalizer in FIG. 1 has the property that, regardless of which polarity distorts the input signal, one of the two variable capacitance diodes opposes the equalization and the other reinforces the equalization. To what extent this takes place depends on the amount of existing bias voltage polarized in the high-resistance direction.

Figure 2:
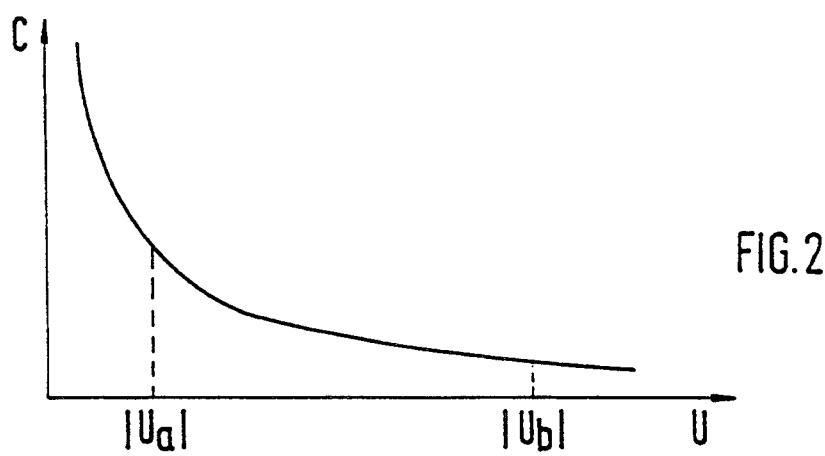
FIG. 2 schematically shows the dependence of the capacitance of a variable capacitance diode on the blocking voltage existing therein.

It will now be explained by means of FIG. 2, that by adjusting the amounts of both bias voltages, one of the two variable capacitance diodes can be made to perform the desired equalization function, while the other is nearly inactive with respect to distortion or equalization. The curve in FIG. 2 shows schematically and only qualitatively, how the capacitance of a variable capacitance diode depends on the existing blocking voltage in the high-resistance direction. It can be seen that the capacitance decreases with increasing blocking voltage, and that the steepness, at which the capacitance decreases, also decreases as the blocking voltage increases. Consequently, a diode must operate at a low blocking voltage, if it is intended to strongly change its capacitance by means of the existing voltage, and it must operate at a high blocking voltage, if it is intended to change its capacitance very little with the voltage. Thus, if the bias voltage $-U_a$ of variable capacitance diode $C_a$ is chosen for the circuit in FIG. 1, so that its amount is small, a working point is thereby selected for this variable capacitance diode, at which the capacitance is highly voltage-dependent, as shown in FIG. 2. If bias voltage $+U_b$ of variable capacitance diode $C_b$ is simultaneously chosen, so that its amount is high, a working point is thereby selected at which the capacitance depends only slightly on the voltage, as shown in FIG. 2. In that case, depending on how the distortion of the input signals depends on their polarity, $C_a$ has a strong equalizing effect or a strong distorting effect, and $C_b$ has a weak distorting or a weak equalizing effect. Inversely, a high amount of bias voltage in $C_b$ and a small amount of bias voltage in $C_a$ can place the former in a condition of strong voltage-dependence, and the latter in a condition of only weak voltage-dependence.

In the practical application of the new equalizer, it can be detected as follows, whether the desired equalization function results from a high amount of bias voltage in $C_a$ and a low amount of bias voltage in $C_b$, or vice versa.

The criterion for control of the equalization by adjusting bias voltages $U_a$ and $U_b$, is the nonlinear signal distortion experienced by the signal to be transmitted due to "laser chirp", and the chromatic dispersion of the optical fiber that forms the transmission path to the optical receiver. This nonlinear distortion is expressed by a contribution to undesirable signal portions in the optical receiver's output signal, and in a possible electrical amplifier connected downstream. Of the undesirable signal portions, composite second order distortion products are particularly disturbing. These are oscillations at frequencies such as do not occur in the transmitted signal, namely oscillations at frequencies which are composed of the sum and difference frequencies of the oscillations that constitute the input signal to the transmission path laser.

To establish a dimension of the occurring distortion products, a so-called pilot signal of a determined frequency, i.e. an unmodulated oscillation, may be added to the laser input signal, and the resulting second order distortion products, namely oscillations with double their frequency level, can be measured on the receiving side. However, two such pilot signals may also be added and the resulting oscillation can be measured on the receiving side by the sum of their frequency levels. In each instance, second order distortion products are a measure of the nonlinear distortions of the transmitted signals.

It is the goal of the equalization to suppress the second order distortion products as much as possible. The relative measure of the suppression of second order distortion products is therefore an indication of the effectiveness of the equalization.

The bias voltages of both variable capacitance diodes $C_a$ and $C_b$ are now adjusted as follows, as a function of the second order nonlinear distortion factor of the pilot signal, measured at the equalizer output. First, both bias voltages are adjusted to their maximum value. According to FIG. 2, at maximum bias voltage they have no significant effect on the distortion of the signal. Then the amount of one of the two bias voltages is reduced and the change in the measured nonlinear distortion factor is observed. For example, if the amount of $U_a$ is reduced and causes the distortion factor to increase, it is clear that $C_a$ is not the variable capacitance diode that can produce the desired equalization at low blocking voltage. $U_a$ is then reset to the maximum value of e.g. 30 V. After that, an optimum equalization is adjusted by means of bias voltage $U_b$, which is achieved by decreasing the amount of $U_b$, thereby also reducing the measured distortion factor, until the distortion factor begins to increase again, i.e. has reached its minimum.

The described adjustment of the bias voltages of both variable capacitance diodes may be performed manually, as a function of an indication from an instrument measuring the distortion products, or these voltages may be adjusted by an automatic control, consisting of such a measuring instrument and a control, which adjusts the bias voltage as a function of the measured value. An automatic control is preferable, since the equalizer of the invention is then automatically adjusted for any optical transmission path, and can also be adjusted for any changes that may occur in a transmission path due to maintenance, repair or any other changes in the transmission network, which invert the polarity of the receiving signals at the end of the transmission path. An adjustment after the optimization may be necessary during operation, for example with temperature fluctuations, or due to the aging of components or other changes.

The above portion of the description considered the case in which one of the two variable capacitance diodes, e.g. $C_a$ is so biased, that it performs the required equalization, i.e. functions at a working point at which its C-U curve (FIG. 2) has the necessary steepness, while the other variable capacitance diode functions at a working point at which its C-U curve has practically no steepness. Now, it may happen during the operation of such an equalizer, that the required equalization decreases, either because the laser primarily responsible for the distortion in the transmission path has been replaced with a better one, or that the equalizer is connected to an optical fiber or a optical fiber with less chromatic dispersion, or to a optical fiber of a smaller length. The blocking voltage must then be increased accordingly, so that the equalizer can function at a low steepness working point in the C-U curve, thereby adapting the equalization to the change in circumstances.

As shown in FIG. 2, such an adaptation unavoidably reduces the capacitance of the variable capacitance diode that performs the equalization, which in turn can change the wave impedance of the line and thereby the attenuation of the frequency dependence of the signals to be transmitted. It may therefore occur that, although the equalization is optimized with the cited adaptation, the frequency dependence of the equalizer attenuation, the so-called frequency response, is thereby simultaneously degraded.

It would therefore be desirable to be able to balance any reduction of the LC component's capacitance, undertaken for equalization purposes.

A further development of the invention described so far will be explained by means of FIG. 3. The left portion of the circuit in FIG. 3 contains precisely the LC component shown in FIG. 1, which requires no further explanation. The right portion shows an antiseries circuit of two variable capacitance diodes $C_8$ and $C_9$, which is connected in parallel with the capacitance of the LC component explained so far. An adjustable voltage source $U_s$, whose one pole is connected to ground and its other pole, positive with respect to ground, is connected through a resistor $R_s$ to the cathode connection points of both variable capacitance diodes, serves to bias both variable capacitance diodes $C_8$ and $C_9$ in the high-resistance direction. A capacitor $C_L$ is grounded parallel to the voltage source, to block high frequency oscillations from voltage source $U_s$.

As will be explained later, the equalizer according to FIG. 3 has the advantage that the total capacitance of the antiseries circuit of both variable capacitance diodes $C_8$ and $C_9$ depends on the bias voltage $U_s$, and can be controlled thereby; however, on the other hand, and at least in the first approximation, it does not depend on signal voltage $U_i$, and therefore has no effect on the distortion or equalization of the signal. In this way, an adjustable capacitance is located in parallel with the parallel circuit of the $C_a$ and $C_b$ capacitances, to compensate for an unavoidable change in the capacitance of $C_a$ or $C_b$, occurring in conjunction with the required equalization of the signal.

Since the adjustable capacitance of the antiseries circuit of $C_8$ and $C_9$ offers the possibility to add the capacitance of variable capacitance diode $C_a$, adjusted for optimum equalization, to the total capacitance of the LC component, which guarantees the desired frequency response of the LC component, it is also possible to first adjust $C_a$ for medium equalization, as the starting point, and to adjust the total capacitance of the LC component for an optimum frequency response, by appropriately selecting the control voltage $U_s$. If, when starting from such a working point, it is necessary to increase the equalization, therefore to increase the capacitance of $C_a$, this may be balanced by a corresponding reduction of the capacitance of the antiseries circuit of $C_8$ and $C_9$, by changing the control voltage $U_s$.

In general, the series circuit of $C_8$ and $C_9$ is an adjustable capacitance, which serves to balance, with respect to the total capacitance of the LC component, any change of $C_a$ or $C_b$ needed to optimize the equalization, so that the LC component's frequency response can be kept constant, in spite of changes in $C_a$ or $C_b$.

The following explains why the total capacitance of the series circuit depends essentially only on control voltage $U_s$, and not on signal voltage $U_i$. As long as signal voltage $U_i$ is zero, the control voltage $U_s$ lies between the cathode and anode of $C_8$, and also between the cathode and anode of $C_9$ (no DC current flows through $R_s$). The variable capacitance diodes $C_8$ and $C_9$ are equal, and their capacitance, adjusted by the control voltage $U_s$, is always described by $C_0$. A signal voltage $U_i$ produces a voltage $U_{C8}=U_s-\frac{1}{2}U_i$ between the anode and the cathode of $C_8$, and a voltage $U_{C9}=U_s\frac{1}{2}U_i$ between the cathode and the anode of $C_9$, since half of the voltage $U_i$ drops off in $C_8$ and half in $C_9$. In other words, a change from 0 to $U_i$ in the signal voltage lowers the blocking voltage $U_s$ in $c_8$ by $\frac{1}{2}U_i$, and raises the blocking voltage $U_s$ in $C_9$ by $\frac{1}{2}U_i$. This increases the capacitance of $C_8$ to $C_8=C_0+\Delta C$, and reduces the capacitance of $C_9$ to $C_9=C_0-\Delta C$, where $\Delta C$ represents a low value. The total capacitance of the series circuit is therefore:

$$C_g = \frac{C_8 \cdot C_9}{C_8 + C_9} = \frac{C_0^2 - \Delta C^2}{2C_0} \approx \frac{C_0}{2}$$

because $\Delta C^2$ can be neglected due to the small value of $\Delta C$. Since $C_0$, as stated above, is only determined by $U_s$, the total capacitance, at least in the first approximation, therefore only depends on $U_s$ and not on signal voltage $U_i$.

With the above indicated explanation of the antiseries circuit function of $C_8$ and $C_9$, and once it has been determined which of the two variable capacitance diodes $C_a$ and $C_b$ has the appropriate polarity for the equalization, it is assumed that only the bias voltage of this variable capacitance diode is adjusted for the purpose of optimizing the equalization, and that the bias voltage of the other is kept at its maximum value. This latter variable capacitance diode plays practically no role in optimizing the equalization, and could therefore be omitted, if the appropriate polarity of the equalizing variable capacitance diode is found by other means than the second antiparallel connected variable capacitance diode described in FIG. 1, or if there is no uncertainty about the polarity of the input signal in the first place. In such instances as well, the antiseries circuit of the additional variable capacitance diodes $C_8$ and $C_9$, described in FIG. 3, can be used to balance changes in the bias voltage of the equalizing variable capacitance diode, thereby balancing its capacitance, so that the wave resistance (impedance or reactance) of the LC component, and thereby its frequency response, remains unaffected by the change.

On the other hand, it seems possible to omit the antiseries circuit of $C_8$ and $C_9$, and to balance the change in the capacitance of the one variable capacitance diode $C_a$, by changing the capacitance of $C_b$, i.e. not leaving at the maximum value, but by readjusting it, so that the wave resistance of the LC component in FIG. 1, and thereby its frequency response, stays unaffected by a change in the bias voltage $U_a$, made to optimize the equalization performed by $C_a$.

From the above can be seen that the circuit according to the invention offers several possibilities for adjusting the bias voltages $U_a$ and $U_b$, and possibly the control voltage $U_8$.

The criterion for adjusting the frequency response of the equalizer is the difference in attenuation, which can be measured at the equalizer outlet when different frequencies are transmitted over the entire transmission path. It is preferably measured by adding, on the sending side, two pilot signals with different frequencies and constant levels, to the electrical signal mix being transmitted, and measuring the difference of the levels of both pilot signals at the outlet of the receiving side equalizer, which, in the ideal case, will be a specified value.

The criterion for adjusting the equalization of the equalizer is the above explained second order distortion factor. If this distortion factor is measured with a nonlinear distortion detector, and the difference in the levels of two pilot signals of different frequencies is measured by a so-called frequency response measuring instrument, the equalization, and possibly the equalizer's frequency response, can be adjusted manually, as explained earlier.

Figure 6:
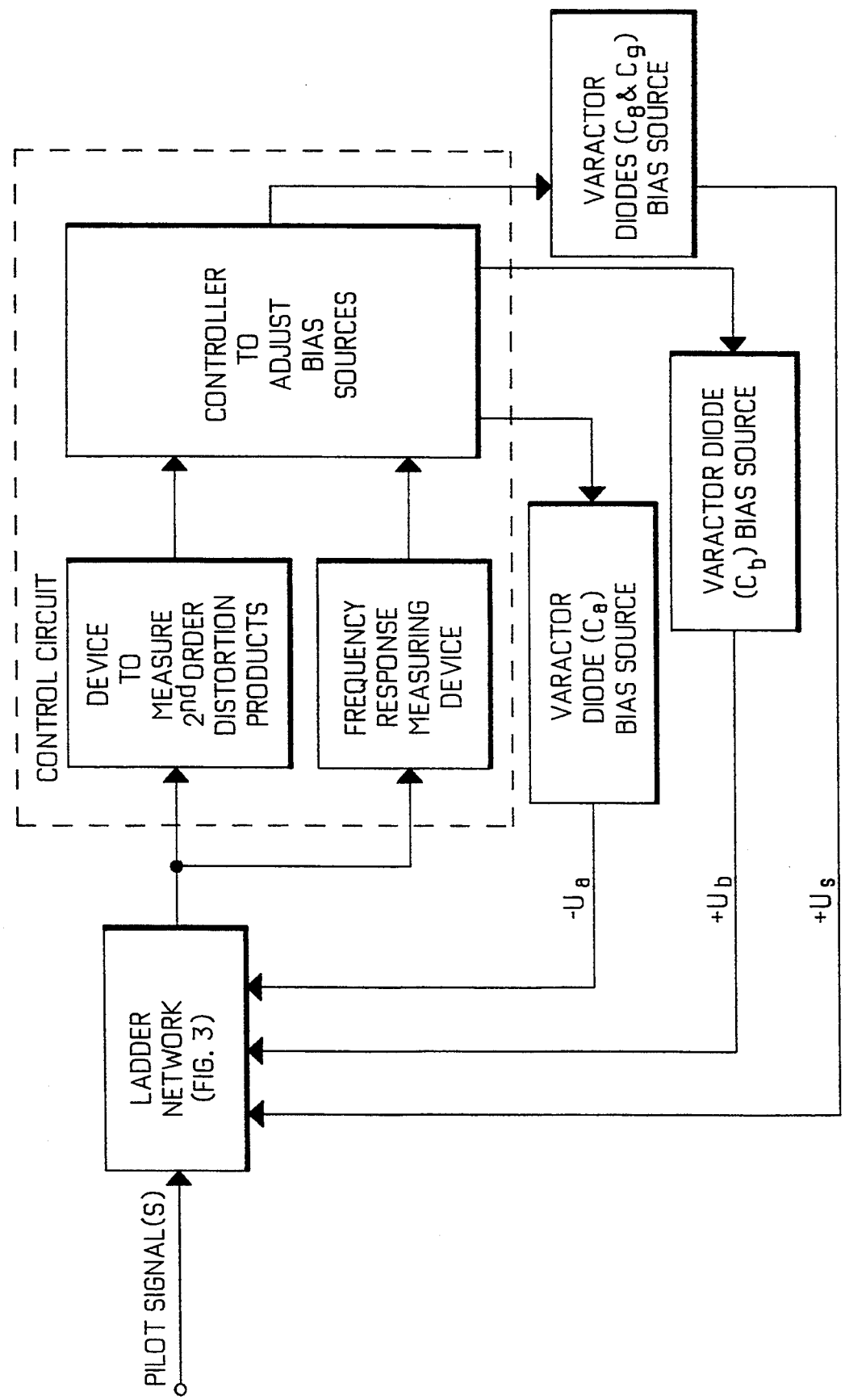
FIG. 6 shows a control circuit which may be used to adjust the bias of the varactors of FIG. 3, for example, according to the invention.

On the other hand, the equalizer can be expanded by adding a control circuit to an automatic equalization and frequency response controller as shown in FIG. 6.

Figure 3:
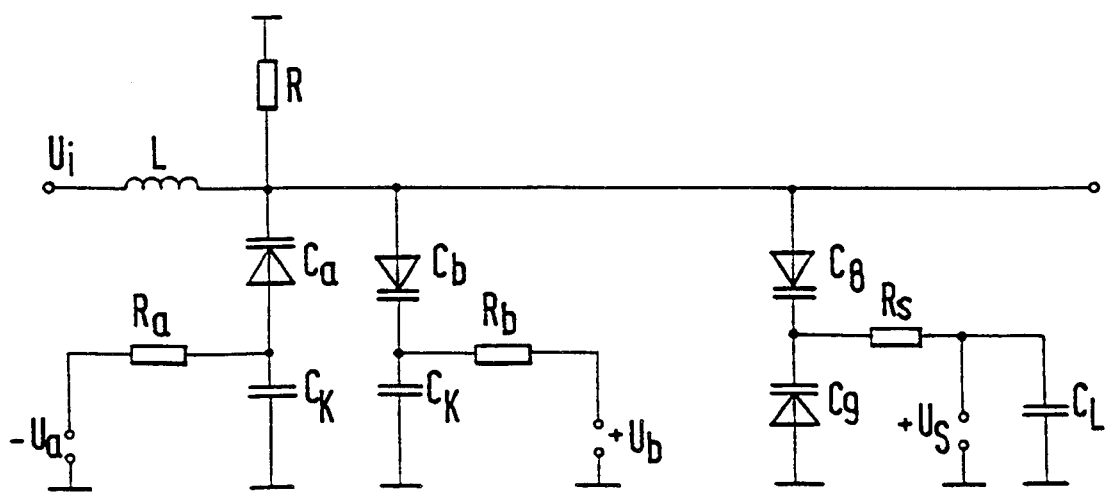
FIG. 3 is a further development of the equalizer according to the invention, to keep the frequency response constant when the equalizer is adjusted.

The following possibilities arise on the basis of the above explained adjustment possibilities and measurable criteria:

a) The circuit contains an equalizer according to FIG. 1. A nonlinear distortion detector is attached to its outlet, to measure second order distortion products created by one or more pilot signals; its output signal is supplied to a control, which adjusts the bias voltages $U_a$ and $U_b$ in accordance with the measured nonlinear distortion factor in such a way, that one of the two diodes performs the equalization, and the other functions at a maximum amount of bias voltage and does not practically contribute to the distortion or equalization.

b) The equalizer is also according to FIG. 1. A nonlinear distortion detector and an instrument for measuring frequency response are attached to its outlet, and measure the second order distortion products created by one or more pilot signals. Both output signals are supplied to a control, which, as described above, adjusts both the required equalization essentially through one of the two diodes, as well as keeps the equalizer's frequency response constant, through the other of the two diodes. The frequency-response-measuring device measures at the output of the LC ladder network the level difference of two pilot signals as a measure of the frequency dependence of the attenuation of the LC ladder network and the controller adjusts the bias of the essentially one of the diodes to obtain a maximum reduction of the measured distortion products as described above and, if necessary, maintains the measured level difference of the two pilot signals constant during any adjustment to the essentially one diode by varying the bias of the other varactor diode.

c) The circuit arrangement contains an equalizer according to FIG. 3, and the control circuit consists of a nonlinear distortion detector attached to the equalizer's outlet, to measure second order distortion products created by one or more pilot signals, and of a frequency response measuring instrument, as described above. Both output signals are supplied to a control, which therewith establishes the magnitude of the adjustment of bias voltages $U_a$, $U_b$ and $U_s$, thereby controlling the equalization and keeping the frequency response constant. In this case, as shown in FIG. 6, for example, the controller adjusts the bias of the essentially one varactor diode to obtain a maximum reduction of the measured distortion products while maintaining the bias of the other varactor diode at a constant maximum value, and adjusts the bias $(U_s)$ determining the total capacitance of the two varactor diodes (C8, C9) in series opposition such that the level difference of the two pilot signals remains.

d) The circuit arrangement contains an equalizer according to FIG. 3, but without a second variable capacitance diode, therefore only with one variable capacitance diode $C_a$ and the pertinent bias voltage circuit, or with only one variable capacitance diode $C_b$ and the pertinent bias voltage circuit. A nonlinear distortion detector, which measures second order distortion products created by one or more pilot signals, as well as a frequency response measuring instrument, are connected to the equalizer outlet, and the output signals are supplied to a control, which establishes the magnitude for adjusting the bias voltage of the variable capacitance diode serving as equalizer, and to keep constant the frequency response of the equalization. Since not only the laser chirp creates second order distortions, in conjunction with the optical fiber's chromatic dispersion, but also the nonlinearity that takes place in the laser due to intensity modulations, it appears useful for the above described receiving side equalization, to use a preequalizer with the laser, to compensate for the laser's nonlinearity, preferably a controlled preequalizer, e.g. as known from DE-A1 33 07 309.

In the above described configuration examples of the invention, the required signal equalization is always performed by the voltage dependence of a single variable capacitance diode, namely the LC component's variable capacitance diode operating at the lower bias voltage ($C_a$ in the example of FIG. 2).

Tests have shown that with the above described LC component, sufficient equalization, which does not attenuate the signals excessively, is only possible if, on the one hand, the distortions to be equalized are not too large, and on the other, the bandwidth of the signals to be transmitted is not too large. The nonlinear distortions experienced by a signal that is optically transmitted through a optical fiber path, and which are to be compensated by the equalization, are caused to a considerable degree by the so-called "laser chirp", i.e. an undesirable wave length oscillation that is a function of the signal amplitude of the optically transmitted electrical signal, in conjunction with the chromatic dispersion of the optical fiber. The larger the "laser chirp", the chromatic dispersion of the optical fiber and its length, the larger are the nonlinear distortions experienced by the signal.

It was shown that a satisfactory signal transmission is possible with a 1550 nm wavelength laser, which has a relatively small "laser chirp", with a standard single-mode optical fiber and an equalizer of the known kind, or the kind described in FIG. 1 or in FIG. 3, if the length of the optical fiber is not longer than 12 km and the bandwidth of the signals to be transmitted is not greater than 450 MHz. If signals, which have traversed more than a 12 km optical fiber length are to be equalized, the known or the above described equalizer only offers the possibility of adjusting the bias voltage of the equalizing variable capacitance diode correspondingly low, which, however, lowers the limit frequency of the equalizer, i.e. the maximum frequency of signals transmitted without attenuation. In other words: if the known or the above described equalizer is able to equalize considerable signal distortions, its limit frequency is so low, that it is too small to transmit broad band signals, such as e.g. the signals of the cable TV frequency band, which extend to 450 MHz.

For certain applications, an equalizer is therefore required which, on the one hand, is appropriate for strong distortions, and on the other has a limit frequency that is high enough for broad bandwidth transmission, e.g. one with a frequency band up to 600

Figure 4:
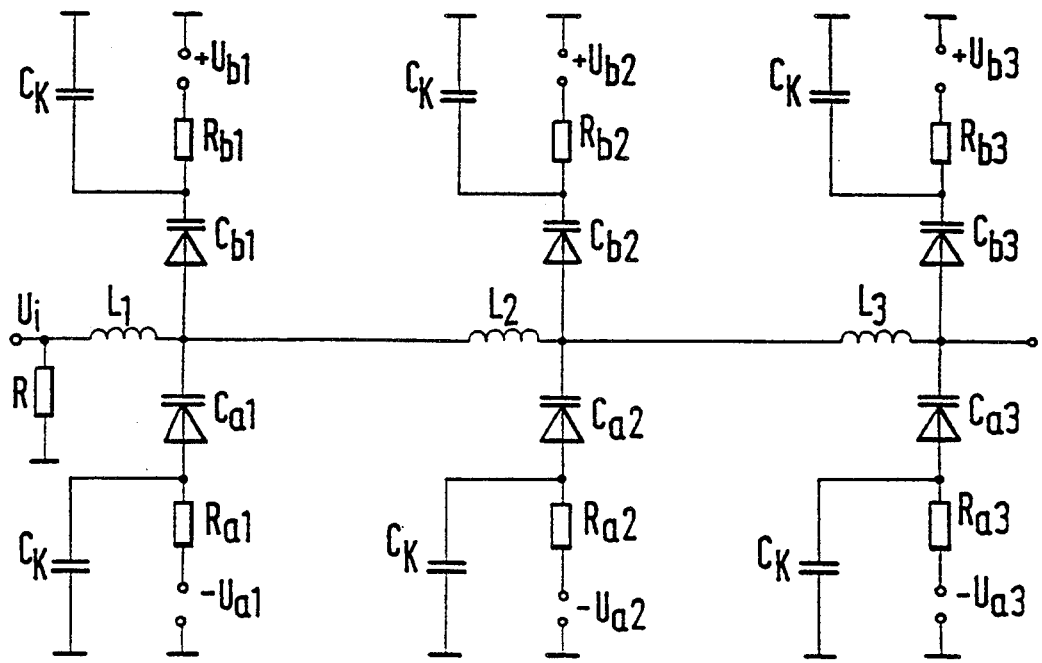
FIG. 4 shows an equalizer according to the invention, consisting of a chain circuit with LC components according to FIG. 1.
Figure 5:
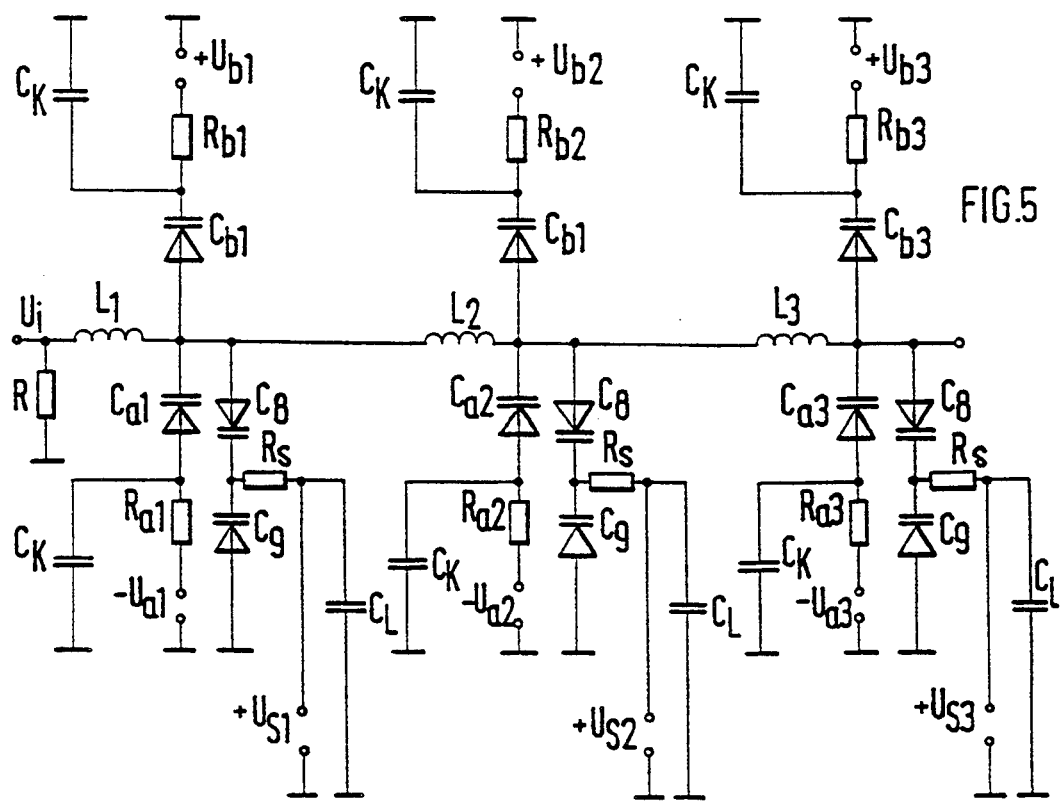
FIG. 5 shows an equalizer according to the invention in the form of an LC chain circuit, with LC components according to FIG. 3.

This goal is attained by a further development of the invention, as shown in FIG. 4 or 5, namely by a chain circuit of LC components as shown in FIG. 1 or 3, and as explained above.

FIG. 4 shows a chain circuit of three LC components according to FIG. 1, each of which is designed somewhat differently than the one shown in FIG. 1. The same references as for the elements in FIG. 1 are used for each of the LC components, except for a second index, which indicates that the element belongs to the first, second or third LC component.

FIG. 5 shows an LC chain circuit with three LC components according to FIG. 3, therefore the same LC chain circuit as in FIG. 3, but with the additional circuit belonging to each LC component, with the adjustable capacitance of the antiseries circuit of $C_8$ and $C_9$, for keeping constant the frequency response of each LC component in the chain, and thereby the frequency response of the entire chain.

Of course, chain circuits with any number of LC components of the indicated type are suitable in principle, and also LC chain circuits, whose capacitive elements are not only formed by variable capacitance diodes. For example, the chain circuit may contain one or more LC components, which additionally contain a normal capacitor, like the known equalizer.

Everything explained above about the controllability or adjustability of the equalization and the frequency response of an individual LC component in FIG. 1 or 3, applies also to the LC components of the LC chain circuit.

In a chain circuit as shown in FIG. 4 or 5, the inductances and capacitances $C_{ai}$ and $C_{bi}$ ($i=1, 2, 3,...$) can be chosen, in principle, as required by the wave resistance of the line into which the circuit is integrated, and the bandwidth of the signals to be transmitted through the line. It is particularly possible to select the variable capacitance diodes $C_{ai}$ and $C_{bi}$, and/or to operate them at suitable bias voltages, so that they have low capacitance, even in the condition where they must contribute to the equalization.

However, the equalization produced by each individual LC component itself is then relatively small. For example, it is the kind of equalization that results when the capacitance of the diode $C_{ai}$ or $C_{bi}$, serving as the equalizer, is determined by a blocking voltage that lies between the voltage values indicated in FIG. 2. Still, the total LC chain circuit has considerable equalization capability, since the equalization produced by the individual components themselves add to each other, therefore the totality of the LC components creates a sufficient voltage-dependent delay of the input signals, thus sufficient equalization of the nonlinear distorted signals.

Since the total equalization of the LC chain circuit according to the invention is composed of the contributions of the individual LC components, the individual LC components may be operated, so that their capacitance is relatively small, and changes the other circuit parameters very little, even during adjustment of the equalization. This causes their effect on the frequency dependence of the attenuation, the so-called frequency response of the entire LC chain, to be relatively small.

Another advantage of the LC chain circuit according to the invention is that the bias voltages of the individual variable capacitance diodes are chosen unequal, and can be changed independently of each other. This provides as many degrees of freedom as there are variable capacitance diodes, to adjust the equalizer for any existing distortion. For example, it is possible to operate one or more of the LC components at such a high blocking voltage, that it practically contributes nothing to the equalization, and is only permitted to contribute to the equalization when its blocking voltage is reduced as needed.

Of course, it is also possible for the connections of equally polarized variable capacitance diode to be connected to a single voltage source, either through different resistors $R_{a1}$, to $R_{a3}$, or $R_{b1}$, to $R_{b3}$, or through a single resistor, e.g. resistor $R_{a1}$, with the, in this instance, common voltage source $U_{a1}$ or $U_{b1}$, thereby making all equally polarized variable capacitance diodes simultaneously adjustable or controllable.

The same applies respectively with regard to the bias voltage adjustment of the antiseries circuit ($L_8$ and $L_9$) belonging to the LC components, and their adjustment.

We claim:

1. Circuit designed to compensate for nonlinear distortions in signals transmitted through optical communication systems, comprising an inductor-capacitor (LC) section whose capacitive element includes a reverse-biased varactor diode, wherein an additional reverse-biased varactor diode is connected in inverse parallel with said varactor diode, and wherein the two bias voltages are adjustable so that essentially only one of the varactor diodes or essentially only the other has a capacitance varying with the applied signal voltage.

2. A circuit as claimed in claim 1, wherein two additional varactor diodes in series opposition whose total capacitance is determined by an adjustable bias are connected in parallel with the capacitive element of the LC section.

3. A circuit as claimed in claim 1, wherein it has a control circuit which contains:
    a device which measures at the output of the LC ladder network the second-order distortion products of one or more pilot signals as a measure of the nonlinear distortions in the transmitted signals, and
    a controller which adjusts the bias of said one varactor diode to obtain a maximum reduction of the measured distortion products and maintains the bias of said other varactor diode at a constant maximum value.

4. A circuit as claimed in claim 1, wherein it has a control circuit which contains:
    a device which measures at the output of the LC ladder network the second-order distortion products of one or more pilot signals as a measure of the nonlinear distortions in the transmitted signals,
    a frequency-response-measuring device which measures at the output of the LC ladder network the level difference of two pilot signals as a measure of the frequency dependence of the attenuation of the LC ladder network, and
    a controller which adjusts the bias of said one varactor diode to obtain a maximum reduction of the measured distortion products and, if necessary, maintains the measured level difference of the two pilot signals constant during said adjustment by varying the bias of said other varactor diode.

5. A circuit as claimed in claim 2, characterized in that it has a control circuit which contains:
    a device which measures at the output of the LC ladder network the second-order distortion products of one or more pilot signals as a measure of the nonlinear distortions in the transmitted signals,
    a frequency-response-measuring device which measures at the output of the LC ladder network the level difference of two pilot signals as a measure of the frequency dependence of the attenuation of the transmitted signals, and
    a controller which adjusts the bias of said one varactor diode to obtain a maximum reduction of the measured distortion products, maintains the bias of said other varactor diode at a constant maximum value, and adjusts the bias determining the total capacitance of the two varactor diodes in series opposition such that the level difference of the two pilot signals remains substantially independent of said adjustment of the bias of said one varactor diode.

6. Circuit designed to compensate for nonlinear distortions in signals transmitted through optical communications systems, comprising an inductor-capacitor (LC) section whose capacitive element includes a reverse-biased varactor diode, characterized in that two additional varactor diodes in series opposition whose total capacitance is determined by an adjustable bias are connected in parallel with the reverse-biased varactor diode.

7. A circuit as claimed in claim 6, characterized in that it has a control circuit which contains:
    a device which measures at the output of the LC ladder network the second-order distortion products of one or more pilot signals as a measure of the nonlinear distortions in the transmitted signals,
    a frequency-response-measuring device which measures at the output of the LC ladder network the level difference of two pilot signals as a measure of the frequency dependence of the attenuation of the transmitted signals, and
    a controller which adjusts the bias of the varactor diode to obtain a maximum reduction of the measured distortion products and adjusts the bias determining the total capacitance of the two varactor diodes in series opposition such that the level difference of the two pilot signals remains substantially independent of said adjustment of the bias of the varactor diode.

8. Circuit designed to compensate for nonlinear distortions in signals transmitted through optical communication systems, comprising an inductive-capacitive (LC) section having a capacitive element that includes an associated reverse-biased varactor diode, wherein the LC section comprises a ladder network comprising two or more LC ladder sections each having an adjustable bias voltage for adjustably biasing the associated reverse-biased varactor diode.

* * * * *